United States Patent
Altvater et al.

(10) Patent No.: US 6,799,409 B2
(45) Date of Patent: Oct. 5, 2004

(54) MACHINE FOR MANUFACTURING AND PACKAGING FORMED BODIES OF A MOULDABLE SUBSTANCE

(75) Inventors: Frank Altvater, Heilbronn (DE); Kurt Frank, Kirchardt (DE)

(73) Assignee: Hosokawa Bepex GmbH, Leingarten (DE)

( * ) Notice: Subject to any disclaimer, the term of this patent is extended or adjusted under 35 U.S.C. 154(b) by 0 days.

(21) Appl. No.: 10/360,980

(22) Filed: Feb. 7, 2003

(65) Prior Publication Data

US 2003/0126831 A1 Jul. 10, 2003

Related U.S. Application Data

(63) Continuation of application No. PCT/EP01/08901, filed on Aug. 1, 2001.

(30) Foreign Application Priority Data

Aug. 16, 2000 (DE) .......................................... 100 39 975

(51) Int. Cl.[7] .............................................. B65B 63/02
(52) U.S. Cl. .............................. 53/122; 53/529; 53/550
(58) Field of Search ........................... 53/113, 122, 529, 53/550; 426/414

(56) References Cited

U.S. PATENT DOCUMENTS

| | | | |
|---|---|---|---|
| 1,091,568 A | * | 3/1914 | Garfield et al. ................ 53/122 |
| 1,524,915 A | | 2/1925 | Debay |
| 2,010,523 A | | 8/1935 | McClatchie |
| 2,653,430 A | * | 9/1953 | Vogt ............................. 53/122 |
| 2,684,186 A | * | 7/1954 | Mattos ........................ 222/332 |
| 3,578,217 A | | 5/1971 | Miller |
| 4,102,111 A | | 7/1978 | Nack et al. |
| 4,437,294 A | * | 3/1984 | Romagnoli ................... 53/122 |
| 5,385,745 A | * | 1/1995 | Dromgoole et al. ........ 426/392 |

FOREIGN PATENT DOCUMENTS

| | | |
|---|---|---|
| DE | 834364 | 3/1952 |
| FR | 1208465 | 2/1960 |
| WO | WO00/30458 | 6/2000 |

OTHER PUBLICATIONS

Brochure wa704 of company SIG Schweizerische Industrie Gesellschaft.

* cited by examiner

*Primary Examiner*—Stephen F. Gerrity
(74) *Attorney, Agent, or Firm*—Clifford W. Browning; Woodard, Emhardt, Moriarty, McNett & Henry LLP

(57) ABSTRACT

Disposed above a loading section (16), on which horizontally arranged strip-shaped packaging material (P) is longitudinally movable, is a shaping wheel (20), which has an, in relation to the loading section (16), transverse central axis (22) and is rotatable about the latter. The shaping wheel (20) has a cylindrical peripheral surface (24) and contains a plurality of moulds (32) which are disposed at angular intervals, starting from the cylindrical peripheral surface (24), radially in relation to the central axis (22). The peripheral speed of the shaping wheel (20) corresponds to a slip-free rolling of its peripheral surface (24) on the packaging material (P). Each of the moulds (32) contains a piston (50) which is movable back and forth between a retracted position for filling the mould (32) with substance (M) and an advanced position for ejecting the consolidated formed body (F) in a radially outward direction onto the packaging material (P). The shaping wheel (20) travels successively through a filling area (34), in which the moulds (32) are filled with substance (M), a dwell area (36), after travelling through which the substance (M) contained in the mould (32) is a packageable formed body (F), and a deposit area (38), in which each formed body (F) may be deposited from its mould (32) directly on the packaging material (P).

7 Claims, 6 Drawing Sheets

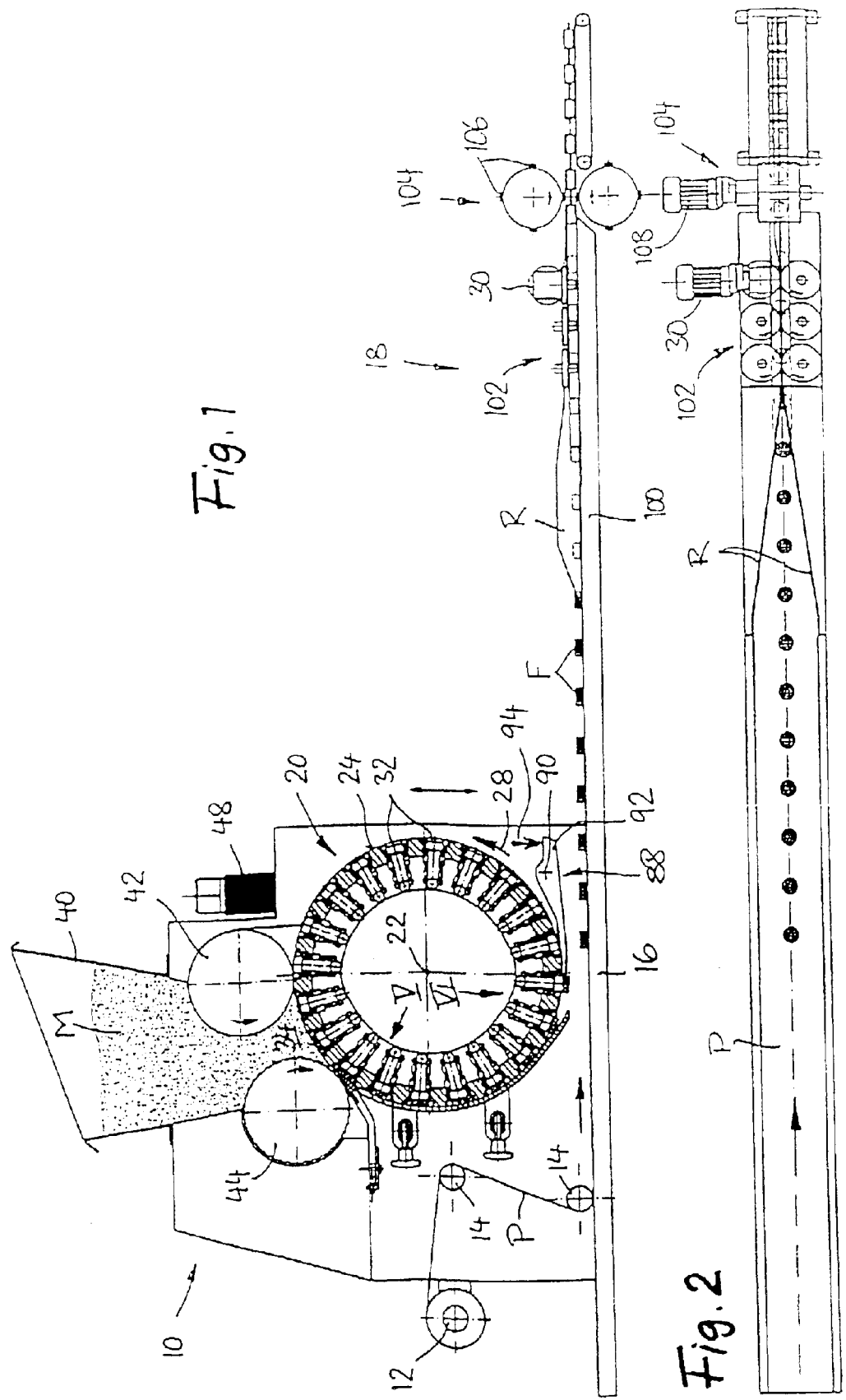

Figure 3:
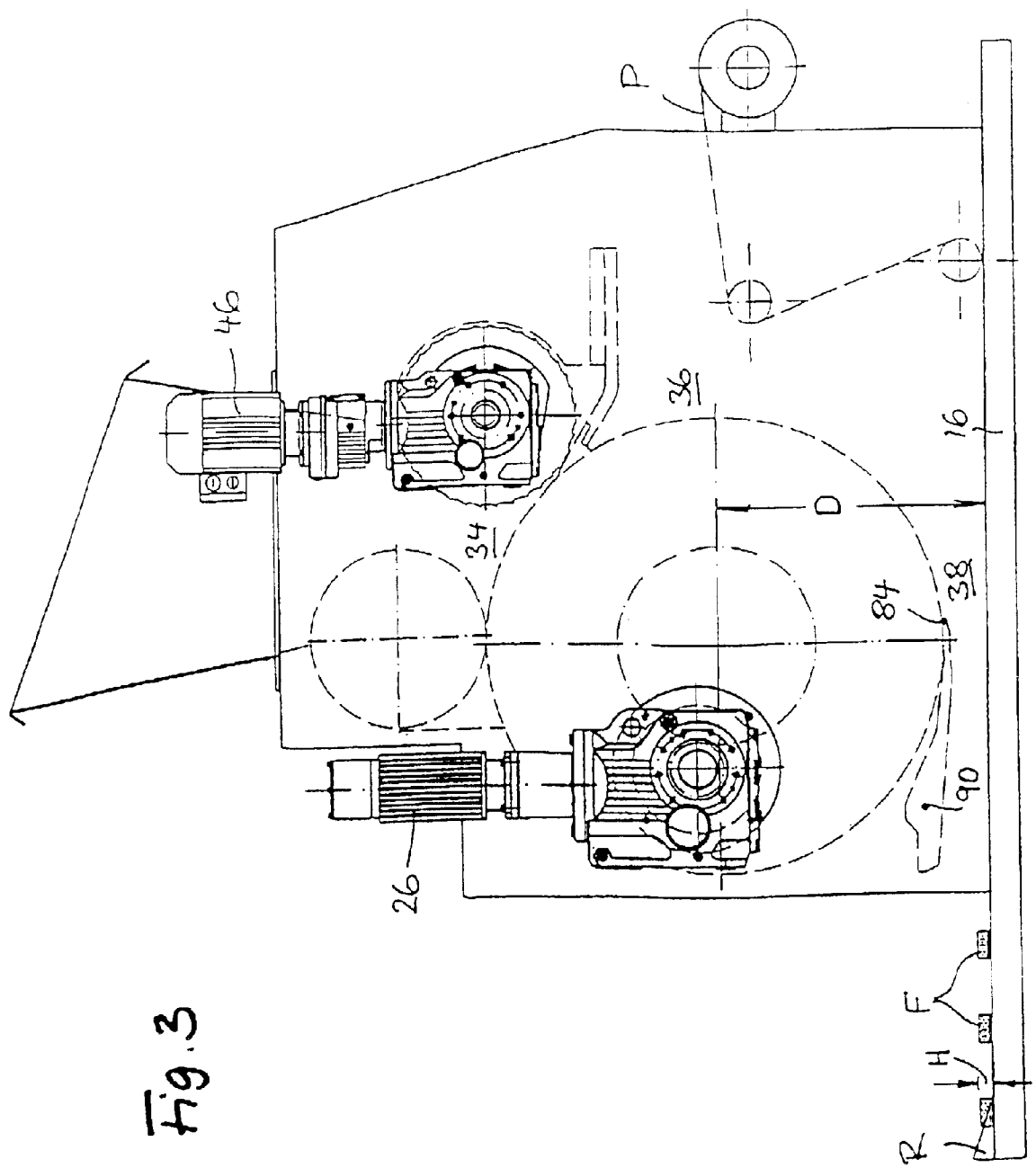
Figure 4C:
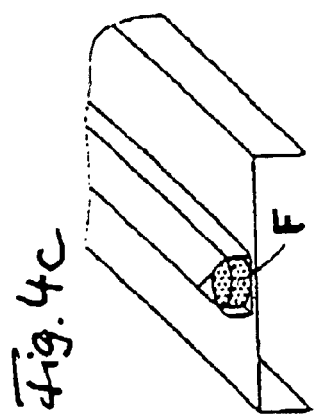
Figure 4F:
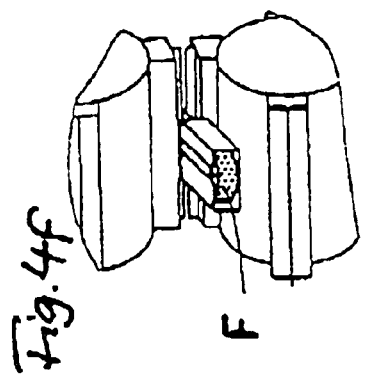
Figure 4B:
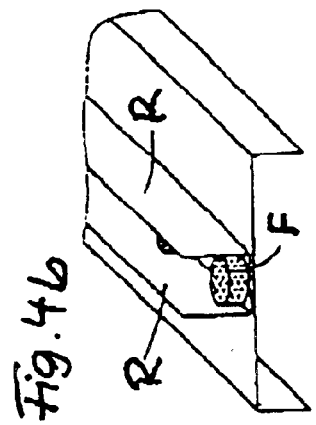
Figure 4E:
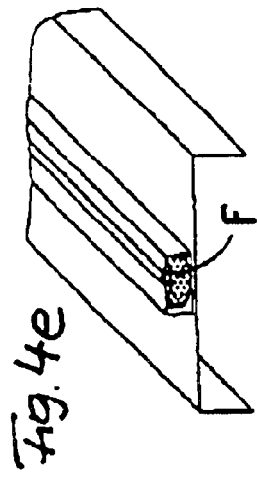
Figure 4G:
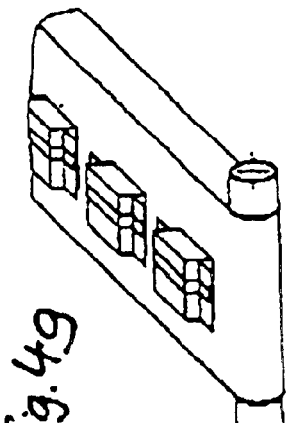
Figure 4A:
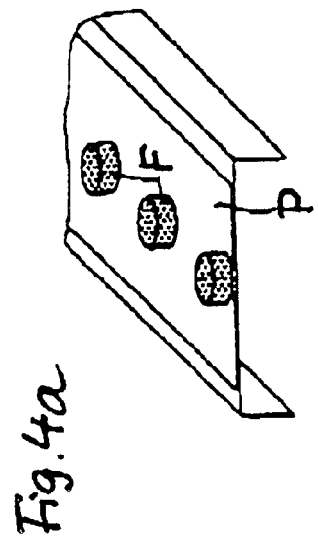
Figure 4D:
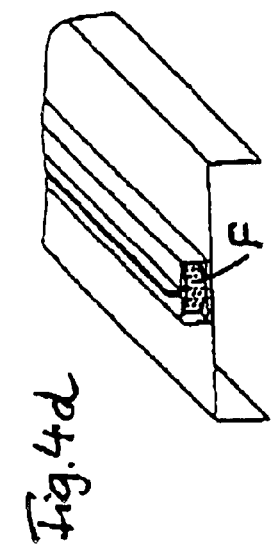

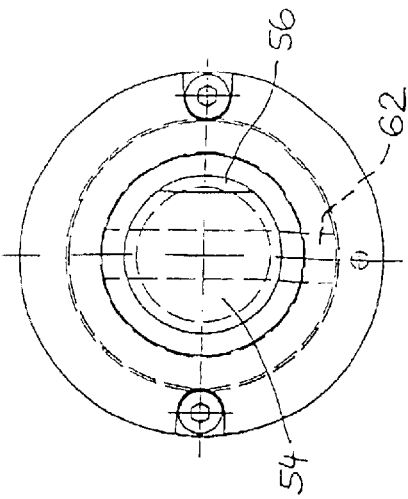
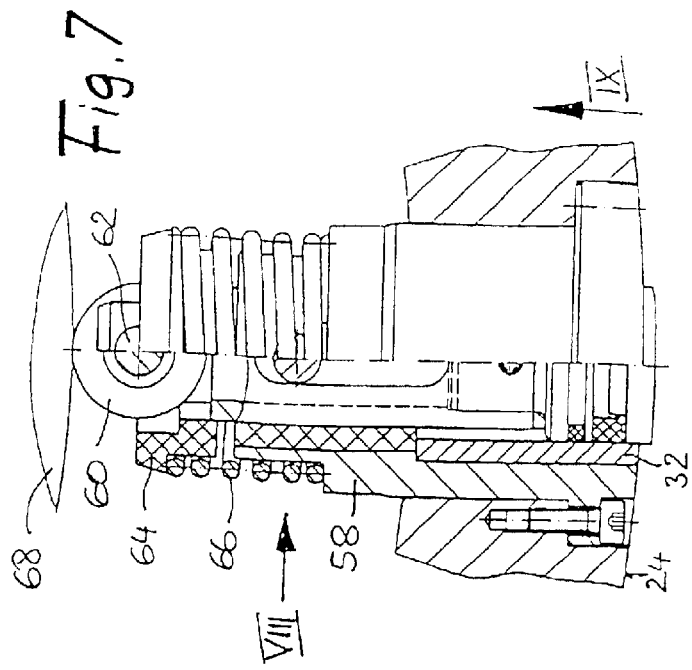
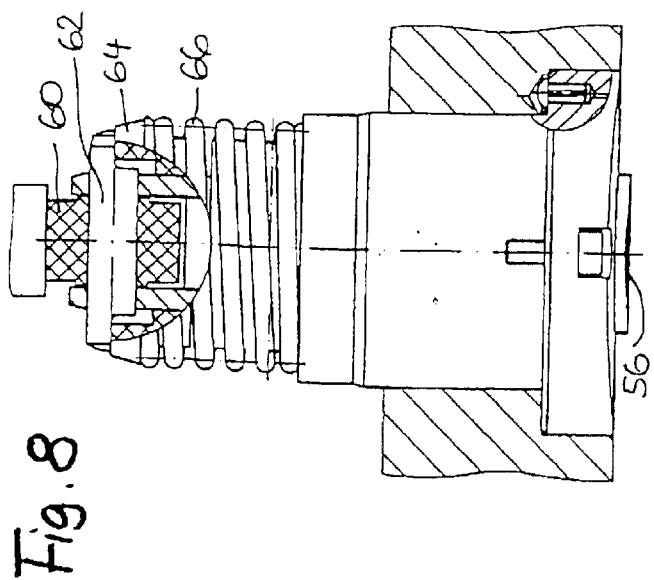

MACHINE FOR MANUFACTURING AND PACKAGING FORMED BODIES OF A MOULDABLE SUBSTANCE

This application is a continuation of international application number PCT EP01/08901, filed Aug. 1, 2001 pending.

The invention relates to a machine for manufacturing and packaging formed bodies of a moldable substance, comprising a loading section, on which strip-shaped packaging material arranged at least approximately horizontally is longitudinally movable, a shaping wheel which is rotatable about a central axis and has a cylindrical peripheral surface as well as a plurality of moulds disposed at angular intervals around said central axis, a filling area, through which the moulds are movable in succession in order to be filled with substance, a dwell area, after travelling through which the substance contained in the mould is a packageable formed body, a deposit area which is disposed above the loading section in such a way that each formed body may be deposited from its mould directly on the packaging material, and a device for wrapping the formed bodies situated on the packaging material.

A known machine of said type (brochure wa 704 of the company SIG Schweizerische Industrie-Gesellschaft, CH-8212 Neuhausen) is provided for manufacturing and packaging block-shaped formed bodies of butter. Said machine has a disk-shaped shaping wheel which is rotatable about a vertical axis and comprises a plurality of moulds of rectangular cross section which extend parallel to the axis of the shaping wheel from the top to the bottom surface of the latter. The shaping wheel is rotatable step by step; each time it stops, one of its moulds is situated in the filling area where it is filled with butter by a pumping set, while a previously filled mould now situated in the deposit area is emptied by the butter portion shaped in said mould being pressed downwards and taken over by a device which already holds a preformed and separated portion of the strip-shaped packaging material and completely encloses the butter portion in said packaging material portion.

From U.S. Pat. No. 1,524,915 a machine for manufacturing blocks or bricks from a plastic substance is known in which, disposed above a loading section, e.g. a conveyor, is a shaping wheel which is rotatable about a horizontal axis disposed at right angles to the loading section. The shaping wheel has radially disposed moulds which contain a piston each and in the radially retracted state of the piston are filled in a filling area and then travel through a compression area in which the substance is compressed by a compression shoe. Finally, the moulds travel through a deposit area in which under the control of a stationary central control cam their piston is displaced in a radially outward direction and ejects the block or brick produced in the mould so that the block or brick is deposited on the loading section. Feeding of packaging material along the loading section for packaging the blocks or bricks is not provided.

The same also applies to similar machines, known from WO 00/30458, for shaping three-dimensional products from foodstuffs, in particular from meat.

The underlying object of the invention is to develop a machine of the initially described type in such a way that formed bodies of a mouldable, in particular glutinous substance may be moulded into shape and packaged by said machine in an even shorter time than with the described known machine.

Proceeding from a machine of the described type the object is achieved according to the invention in that said central axis is disposed transversely at a distance above the loading section, the shaping wheel is drivable at a peripheral speed, which approximately corresponds to that of a slip-free rolling on the longitudinally moving strip-shaped packaging material, the moulds are disposed, starting from the cylindrical peripheral surface of the shaping wheel, radially in relation to the central axis, thereof, each mould contains a separate piston which is movable back and forth between a retracted position for filling the mould with substance and an advanced position for ejecting the consolidated formed body in a radially outward direction onto the packaging material, the device for wrapping the formed bodies lying on the strip-shaped packaging material is formed substantially comprised of:

a bending section for upward bending of the mutually opposite side edges of the strip-shaped packaging material, a longitudinal sealing unit for joining together the two edges of the strip-shaped packaging material, which therefore assumes a tubular shape, and a transverse sealing unit for forming transverse seams in the strip-shaped packaging material between successive formed bodies, and in that associated with the shaping wheel, the longitudinal sealing unit and the transverse sealing unit are drives which may be synchronized with one another for manufacturing and depositing the formed bodies and for moving and sealing the packaging material.

The peripheral speed of the shaping wheel and the linear speed of motion of the strip-shaped packaging material are vectors which, in a relatively large deposit area, are substantially identical to one another not only in their value but also in their direction. It is therefore not necessary for each formed body to be separated from the shaping wheel and taken over by the strip-shaped packaging material exactly at a specific point within the deposit area. The depositing of the formed body may accordingly occur with continuous rotation of the shaping wheel and continuous linear motion of the strip-shaped packaging material. The centrifugal force which acts upon the formed body so long as the latter is participating in the rotation of the shaping wheel, facilitates the separation of the formed body from the piston which has accompanied the formed body en route from the filling area via the consolidation area to the deposit area. After the formed body has been deposited on the packaging material, the latter is gradually deformed in that, first, its lateral edges are bent up on both sides of the formed body and then joined to one another above the formed body. Then, in the hitherto still strip-shaped, i.e. continuous packaging material transverse seams are formed between successive formed bodies and, finally, the packaging material is cut between the formed bodies. All of this helps to enable a high operating speed of the machine according to the invention.

In a preferred embodiment of the machine according to the invention the distance between the central axis of the shaping wheel and the loading section is adjustable for adaptation to formed bodies of differing height. This creates the possibility of adjusting a gap, the height of which is only slightly greater than that of the formed bodies, between the loading section and the region of the peripheral surface of the shaping wheel which is, in each case, closest to the loading section. This helps to guarantee, even at high operating speeds, a precise depositing of the formed bodies on the strip-shaped packaging material.

The pistons are preferably controlled, via a cam follower each connected thereto, by a central control cam in a manner known as such from the cited U.S. Pat. No. 1,524,915. Said control cam does not participate in the rotation of the shaping wheel and may, in the machine according to the invention, be fashioned in such a way that it is directly responsible only for a precisely defined, radially outward displacement of the pistons in the moulds en route from the filling area to the deposit area; the necessary retraction of the pistons en route from the deposit area to the filling area may be achieved by spring force. However, the central control cam may alternatively be fashioned in such a way that it likewise positively controls the radially inward retraction of the pistons, in the manner provided according to U.S. Pat. No. 1,524,915.

For processing substances requiring compression it is advantageous when the moulds along at least one part of the dwell area are sealable by means of a pressing body, which is pressable against the cylindrical lateral surface of the shaping wheel. This too is known from U.S. Pat. No. 1,524,915. In said case, the control cam in the machine according to the invention may be fashioned in such a way that it displaces the pistons in their moulds, as the latter travel from the filling area to the deposit area, in a radially outward direction until the formed bodies produced have reached a predetermined density. Independently thereof, the formed bodies produced in the machine according to the invention may be thermally treated in the dwell area by heating or cooling the moulds.

When it is a matter of manufacturing formed bodies from a glutinous substance, according to a development of the invention it is provided that disposed in the deposit area is a scraper for separating the formed bodies from the pistons. A suitable scraper is, for example, a steel wire, which extends along a surface line of the shaping wheel and is held adjacent to the latter's cylindrical peripheral surface with sufficient force to keep said peripheral surface clean.

In said connection it is further advantageous when the pistons have an end face curved in accordance with the cylindrical peripheral surface of the shaping wheel and having a run-on bevel, which is directed forward in the direction of rotation of the shaping wheel, for the scraper.

For increasing the operating speed in the wider sense it is also advantageous when the moulds are each disposed inside a bush, which is fastened in the shaping wheel in such a way as to be exchangeable together with the associated piston. It is therefore possible to reduce resetting times when a succession of formed bodies of differing shape are to be manufactured and packaged.

Figure 5:
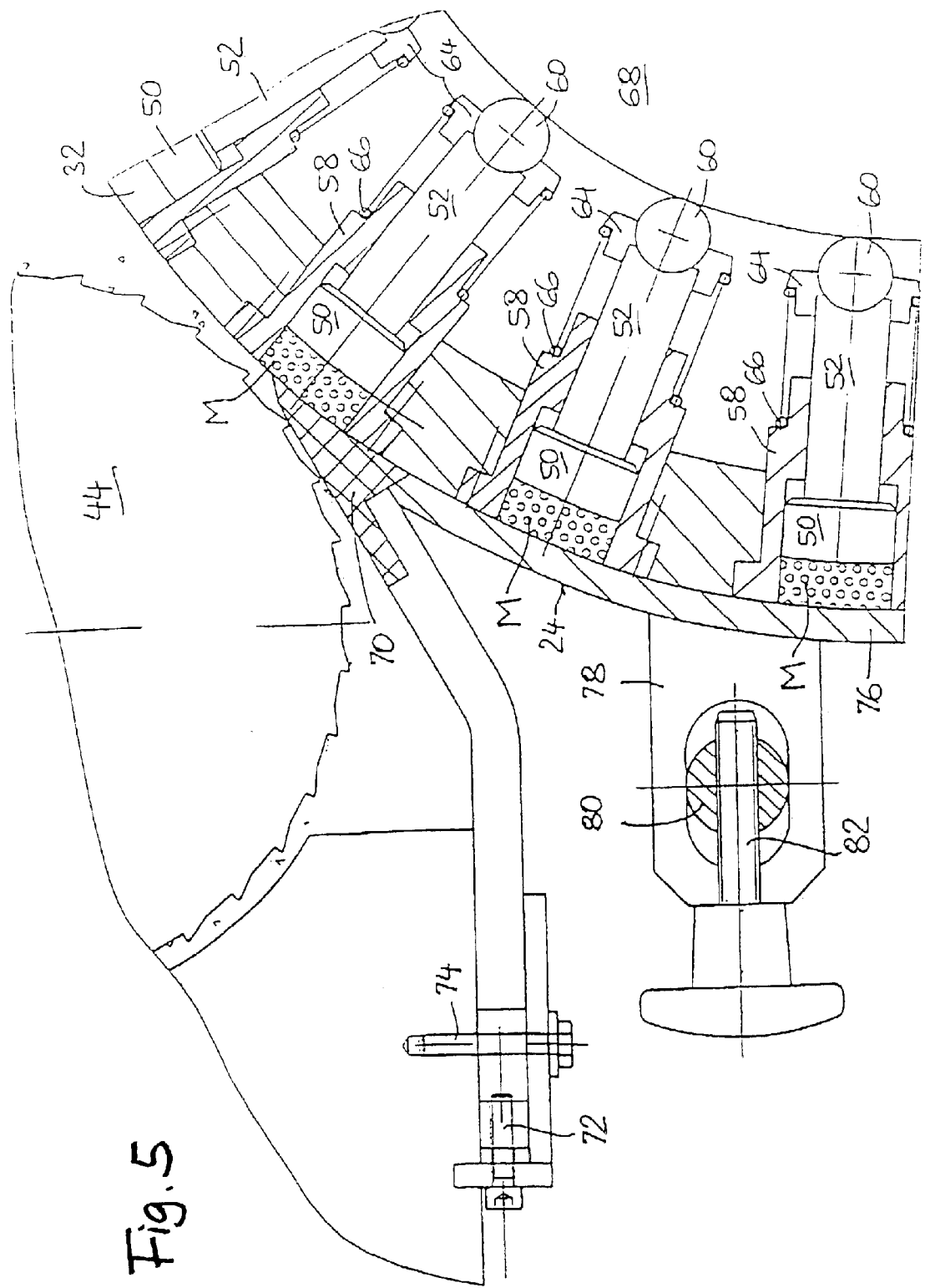
Figure 6:
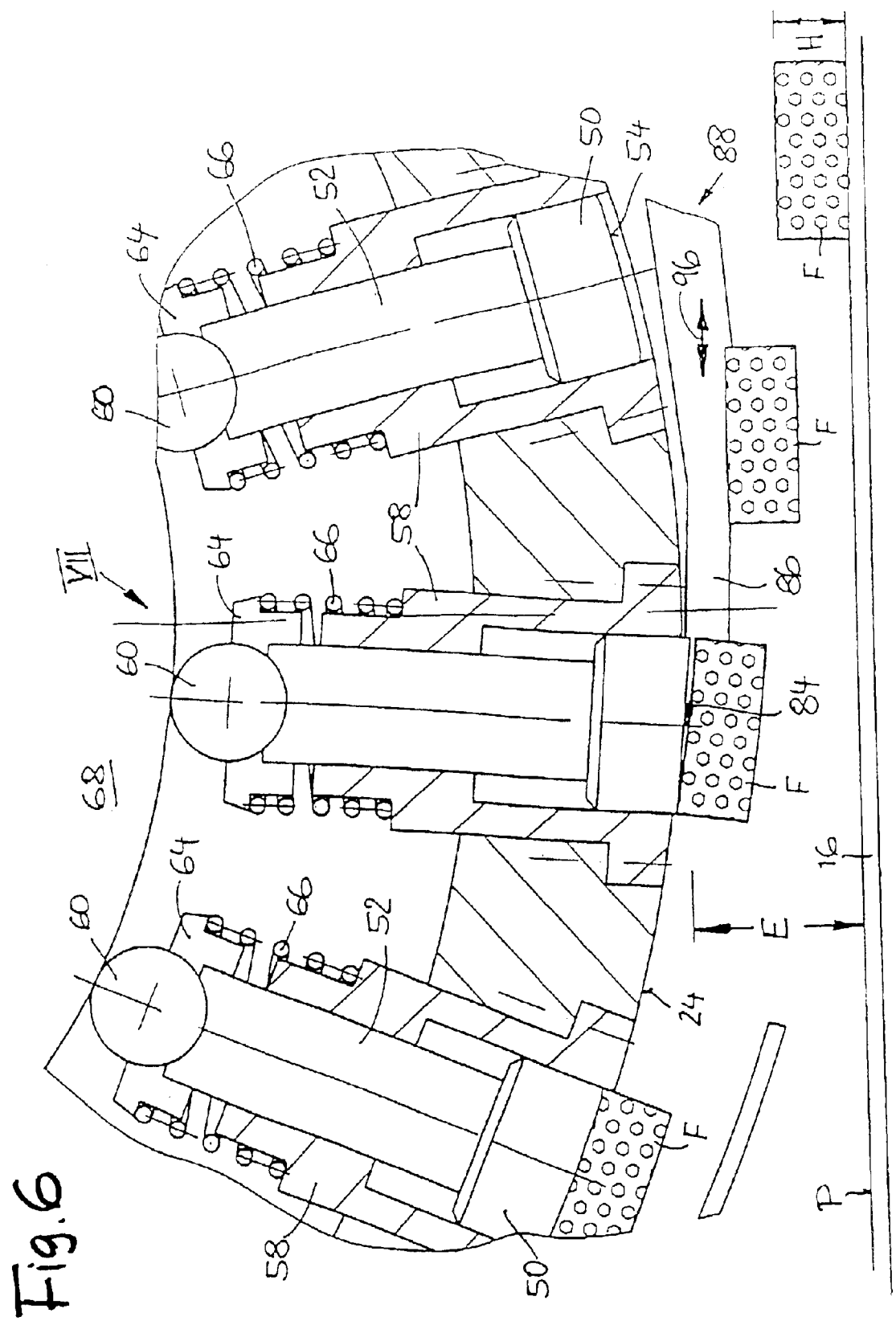

An embodiment with further details of the invention is described below with reference to diagrammatic drawings; said drawings show in:

FIG. 1 a side view of a machine according to the invention as a whole,

FIG. 2 the associated plan view,

FIG. 3 the opposite side view of the part of the machine disposed on the left in FIG. 1, drawn to an enlarged scale, FIGS. 4a–4g several successive stages, of the packaging formed bodies, FIG. 5 a very enlarged detail in the region V of FIG. 1, FIG. 6 a likewise very enlarged detail in the region VI of FIG. 1, FIG. 7 a closer view of the region VII in FIG. 6, FIG. 8 the view in the direction of the arrow VIII in FIG. 7, shown partially in section, and FIG. 9 the view in the direction of the arrow IX in FIG. 7.

The illustrated machine has a box-shaped frame 10 which, in order to make details visible, is shown in FIG. 1 without its side wall facing the viewer. Built onto the outside of the frame 10 is a material dispenser 12 in the form of an uncoiler for rolled-up strip-shaped packaging material P. The strip-shaped packaging material P extends from the material dispenser 12 into the frame 10, runs via guide rollers 14 mounted in the latter and further over a straight, horizontal loading section 16, which in the illustrated example is formed by an elongate plate, the surface of which together with the packaging material P forms a low-friction pairing. Downstream of the loading section 16 is a device 18 for wrapping formed bodies F, which are manufactured from a substance M on the illustrated machine.

In the box-shaped frame 10 a circular-cylindrical shaping wheel 20 is mounted so as to be rotatable about a central axis 22, which is disposed at a distance D above the loading section 16 transversely relative to the latter, i.e. at right angles to the longitudinal direction of the strip-shaped packaging material P moving over the loading section 16. The shaping wheel 20 has a cylindrical peripheral surface 24, the lowermost surface line of which is disposed at a distance E above the loading section 16, which distance is only slightly greater than the height H of each individual formed body F.

Built onto the frame 10 is a controllable drive 26, e.g. in the form of an electric servomotor, which allows the shaping wheel 20 to rotate at a selectable constant peripheral speed 28, optionally also intermittently, about the central axis 22. Said drive 26 may be synchronized with a drive 30 of the device 18 for wrapping the formed bodies F.

The shaping wheel 20 contains cylindrical moulds 32, which are disposed radially at regular angular intervals around the central axis 22 and in the illustrated example are circular-cylindrical but may, in principle, have any cross-sectional shape adapted to the desired shape of the formed bodies F. As the shaping wheel 20 rotates, the moulds 32 travel successively through a filling area 34, a dwell area 36 and a deposit area 38 and finally return to the filling area 34.

The filling area 34 is formed at the bottom end of a funnel 40, which projects into the box-shaped frame 10, and is delimited at the front and rear, in relation to the direction of rotation of the shaping wheel 20, by two rollers 42 and 44 axially parallel to the shaping wheel 20. The roller 42 has a smooth peripheral surface and is disposed in such a way that the latter lies adjacent to the cylindrical peripheral surface 24 of the shaping wheel 20 so as to slide approximately along the latter's uppermost surface line or lies at an extremely small distance opposite it. The roller 44 has a surface, which is ribbed parallel to its axis, and is disposed in relation to the direction of rotation of the shaping wheel 20 downstream of the smooth roller 42, further below, in such a way that it may roll on the cylindrical peripheral surface 24 of the shaping wheel 20. The two rollers 42 and 44 are driven by a common, controllable motor 46, e.g. by an electric servomotor, in such a way that the smooth roller 42 rotates in the same direction as, and the ribbed roller 44 rotates in the opposite direction to, the direction of rotation of the shaping wheel 20, wherein the peripheral speed of both rollers 42 and 44 is preferably slightly lower than the peripheral speed of the shaping wheel 20. Both rollers 42 and 44 therefore exert downwardly directed driving forces upon the substance M contained in the funnel 40 without conveying said substance outwards in peripheral direction of the shaping wheel 20.

Further disposed on the frame 10 is a motor 48 for adjusting the distance D of the central axis 22 from the loading section 16.

Each of the moulds 32—in the illustrated example there are altogether twenty such moulds provided in the shaping wheel 20—contains a piston 50, which is connected to or formed integrally with a push rod 52. Each of the pistons 50 is movable radially back and forth inside the cylindrical mould 32 containing it and has an outer end face 54, which is curved in an identical manner to the cylindrical peripheral surface 24 around the central axis 22 and, in the fully extended position of the piston 50, together with the peripheral surface 24 of the shaping wheel 20 forms a uniform cylinder surface. Said cylinder surface is interrupted only by the fact that the end face 54 of each piston 50 has at its, in direction of rotation of the shaping wheel 20, front side a run-on bevel 56.

The moulds 32 might be formed directly in the shaping wheel 20; in the illustrated example, however, they are each disposed in a bush 58, which in an easily exchangeable manner is inserted radially from the outside into the shaping wheel 20 and screw-fastened.

Each of the push rods 52 is designed in the shape of a fork in its radially inner end region and, there, carries a cam follower 60 in the form of a cylindrical roller made of plastics material, which is mounted rotatably on an axle pin 62. The axle pin 62 extends through the fork-shaped end of the associated push rod 52 and in accordance with FIG. 8 has two flattened ends, against which an annular spring seat 64 is supported. Between the latter and the associated bush 58 a spring 66, in the illustrated example a helical compression spring, is held in a biased manner such that it loads the associated push rod 52 and hence also piston 50 continuously with a force directed radially in towards the central axis 22 and ensures that the associated cam follower 60 rolls along a central control cam 68.

The control cam 68 is disposed in a stationary manner inside the shaping wheel 20 and fashioned in such a way that in the filling area 34 each of the pistons 50 retracts into its innermost position closest to the central axis 22 and in so doing sucks material M into the associated mould 32. In the deposit area 38 each piston 50 reaches its outermost position, in which its outer end face 54 in the described manner is flush with the cylindrical peripheral surface 24 of the shaping wheel 20.

The shaping wheel 20 together with the ribbed roller 44 forms an interstice remote from the funnel 40, in which interstice a deflector 70 is disposed. The latter is displaceable by means of a setting screw 72 (FIG. 5) into or out of the said interstice, depending on which position of the deflector 70 is the most advantageous for the given substance M to be processed. The selected position of the deflector 70 may be fixed by means of a clamping screw 74.

The deflector 70 may be adjoined by a pressing body 76, which is illustrated in FIGS. 1 and 5 as a partially cylindrical sliding block, of which the inner surface facing the shaping wheel 20 is concave and has the same radius of curvature as the cylindrical peripheral surface 24. Extending horizontally away from the rear of the pressing body 76 are two slotted tabs 78, which are each supported on a cross-bar 80, which is fastened in the frame 10, so as to be displaceable by means of a setting screw 82 horizontally towards and away from the shaping wheel 20. In its illustrated operating position the pressing body 76 in the dwell area 36 overlaps a plurality of, e.g. five or six, moulds 32 and seals them off tightly in a radially outward direction. The substance M, which in the filling area 34 has passed under the influence of the rollers 42 and 44 into the moulds 32, may therefore be compressed in the dwell area 36 in that the central control cam 68 is fashioned in such a way that it presses the pistons 50 a little further outwards in the dwell area 36.

Independently thereof, the moulds 32 may be cooled, e.g. with liquid nitrogen, in the dwell area 36 so as to produce in the moulds 32 formed bodies F of adequate stability before the latter pass into the deposit area 38.

Disposed in the deposit area 38 is a scraper 84, which scrapes each individual formed body F off the previously applied piston 50 and hence ensures that the formed body drops onto the packaging material P, the rectilinear motion of which beyond the loading section 16 corresponds in magnitude and direction to the peripheral speed 28, which the relevant formed body F brings with it from its being conveyed in the shaping wheel 20. The scraper 84 in the illustrated example is a steel wire, which extends along the lowermost surface line of the cylindrical peripheral surface 24 of the shaping wheel 20 and is carried by a fork-shaped arm 86 of a two-armed lever 88. The lever 88 is pivotal about a swivelling axis 90 extending parallel to the central axis 22 and is loaded at its arm 92 remote from the scraper 84 with an adjustable, downwardly directed force 94, which may be a spring force. The swivelling axis 90, and hence the entire two-armed lever 88 with the scraper 84, is displaceable in tangential direction of the cylindrical peripheral surface 24 in accordance with the arrow 96 in FIG. 6 so that the most advantageous location of the scraper 84 is selectable in accordance with the nature of the substance M to be processed.

The device 18 for wrapping the formed bodies F substantially comprises a bending section 100, along which the strip-shaped packaging material P is bent upwards in the region of its mutually opposite edges R. Provided downstream thereof is a longitudinal sealing unit 102 having a plurality of rollers arranged in pairs, between which the edges R run through and by which they are drawn forward and joined, e.g. welded, together. The rollers of the longitudinal sealing unit 102 are driven by the already mentioned drive 30, which may be synchronized with the drive 26 of the shaping wheel 20.

The longitudinal sealing unit 102 is adjoined by a transverse sealing unit 104, which is formed substantially by a pair of rollers having welding jaws 106 disposed at angular intervals and by a drive 108 which rotates the rollers and is likewise synchronized with the previously described drives 26 and 30. The transverse sealing unit 104 is designed to form transverse seams between successive formed bodies F in the hitherto still continuous strip-shaped packaging material P and moreover to cut the packaging material between the formed bodies.

What is claimed is:

1. Machine for manufacturing and packaging formed bodies (F) of a mouldable substance (M), comprising
   a loading section (16), on which strip-shaped packaging material (P) arranged at least approximately horizontally is longitudinally movable,
   a shaping wheel (20) which is rotatable about a central axis (22) and has a cylindrical peripheral surface (24) as well as a plurality of moulds (32) disposed at angular intervals around said central axis (22),
   a filling area (34), through which the moulds (32) are movable in succession in order to be filled with substance (M), a dwell area (36), after travelling through which the substance (M) contained in the mould (32) is a packageable formed body (F), a deposit area (38) which is disposed above the loading section (16) in such a way that each formed body (F) may be deposited from its mould (32) directly on the packaging material (P), and a device (18) for wrapping the formed bodies (F) situated on the packaging material (P), characterized in that said central axis (22) is disposed transversely at a distance (D) above the loading section (16), the shaping wheel (20) is drivable at a peripheral speed (28) which approximately corresponds to that of a slip-free rolling on the longitudinally moving strip-shaped packaging material (P), the moulds (32) are disposed, starting from the cylindrical peripheral surface (24) of the shaping wheel (20), radially in relation to the latter's central axis (22), each mould (32) contains a separate piston (50) which is movable back and forth between a retracted position for filling the mould (32) with substance (M) and an advanced position for ejecting the consolidated formed body (F) in a radially outward direction onto the packaging material (P), the device (18) for wrapping the formed bodies (F) lying on the strip-shaped packaging material (P) is formed substantially by:

a bending section (100) for upward bending of the mutually opposite side edges (R) of the strip-shaped packaging material (P), a longitudinal sealing unit (102) for joining together the two edges (R) of the strip-shaped packaging material (P), which therefore assumes a tubular shape, and a transverse sealing unit (104) for forming transverse seams in the strip-shaped packaging material (P) between successive formed bodies (F), and in that associated with the shaping wheel (20), the longitudinal sealing unit (102) and the transverse sealing unit (104) are drives (26, 30, 108), which may be synchronized with one another, for manufacturing and depositing the formed bodies (F) and for moving and sealing the packaging material (P), and characterized in that the distance (D) between the central axis (22) of the shaping wheel (20) and the loading section (16) is adjustable for adaptation to formed bodies (F) of differing height (H).

2. Machine according to claim 1 characterized in that the pistons (50) are controlled, via a cam follower (60) each connected thereto, by a central control cam (68).

3. Machine according to claim 1, characterized in that the moulds (32) along at least one part of the dwell area (36) are sealable by means of a pressing body (76), which is pressable against the cylindrical peripheral surface (24) of the shaping wheel (20).

4. Machine according to claim 1, characterized in that a scraper (84) for separating the formed bodies (F) from the pistons (50) is disposed in the deposit area (38).

5. Machine according to claim 4, characterized in that the pistons (50) have an end face (54) curved in accordance with the cylindrical peripheral surface (24) of the shaping wheel (20) and having a run-on bevel (56), which is directed forward in the direction of rotation of the shaping wheel (20), for the scraper (84).

6. Machine according to one of claims 1, 2, 3, 4 or 5, characterized in that the moulds (32) are each disposed inside a bush (58), which is fastened in the shaping wheel (20) in such a way as to be exchangeable together with the associated piston (50).

7. Machine according to claim 1, characterized in that the transverse sealing unit (104) is designed also to cut the strip-shaped packaging material (P) between successive formed bodies (F).

\* \* \* \* \*